United States Patent
Choi et al.

(10) Patent No.: US 8,802,318 B2
(45) Date of Patent: Aug. 12, 2014

(54) COMPOUND AND COMPOSITION INCLUDING COMPOUND, WITH FUEL CELL, FUEL CELL ELECTRODE AND FUEL CELL ELECTROLYTE MEMBRANE USING SAME

(75) Inventors: Seong-woo Choi, Yongin-si (KR); Cheol-hee Ahn, Seoul (KR); Jung-ock Park, Yongin-si (KR); So-young Park, Seoul (KR)

(73) Assignees: Samsung Electronics Co., Ltd. (KR); SNU R&DB Foundation (KR)

( * ) Notice: Subject to any disclaimer, the term of this patent is extended or adjusted under 35 U.S.C. 154(b) by 618 days.

(21) Appl. No.: 13/100,530

(22) Filed: May 4, 2011

(65) Prior Publication Data

US 2011/0281200 A1   Nov. 17, 2011

(30) Foreign Application Priority Data

May 14, 2010   (KR) ........................ 10-2010-0045480
Mar. 8, 2011   (KR) ........................ 10-2011-0020616

(51) Int. Cl.
 *H01M 4/90*   (2006.01)
(52) U.S. Cl.
 USPC ........................................................ 429/492
(58) Field of Classification Search
 None
 See application file for complete search history.

(56) References Cited

U.S. PATENT DOCUMENTS

| | | |
|---|---|---|
| 4,052,487 A | 10/1977 | Sturtz et al. |
| 5,723,086 A | 3/1998 | Ledjeff et al. |
| 6,221,955 B1 | 4/2001 | Mequanint et al. |
| 2005/0256296 A1 | 11/2005 | Kiefer et al. |
| 2006/0235144 A1 | 10/2006 | Hwang et al. |
| 2008/0145744 A1 | 6/2008 | Kim et al. |
| 2008/1405745 | 6/2008 | Cho et al. |

FOREIGN PATENT DOCUMENTS

| | | |
|---|---|---|
| JP | 8-504293 | 5/1996 |
| JP | 2003-257491 | 9/2003 |
| JP | 2005-85638 | 3/2005 |
| JP | 2007-188753 | 7/2007 |
| KR | 10-2006-0108792 | 10/2006 |
| KR | 10-0773533 | 10/2007 |
| KR | 10-0829554 | 5/2008 |
| WO | WO 2005/060444 | 7/2005 |

*Primary Examiner* — Patrick Ryan
*Assistant Examiner* — Wyatt McConnell
(74) *Attorney, Agent, or Firm* — Cantor Colburn LLP (57) ABSTRACT

A compound that is a polymerization product of a compound composition that contains a diisocyanate-based compound and an aromatic polyol, a composition that contains the compound and an interpenetration polymer, a fuel cell electrode including either the compound or the composition, a fuel cell electrolyte membrane including either the compound or the composition, and a fuel cell including at least one selected from the group consisting of the fuel cell electrode and the fuel cell electrolyte membrane.

19 Claims, 3 Drawing Sheets

COMPOUND AND COMPOSITION INCLUDING COMPOUND, WITH FUEL CELL, FUEL CELL ELECTRODE AND FUEL CELL ELECTROLYTE MEMBRANE USING SAME

CROSS-REFERENCE TO RELATED APPLICATIONS

This application claims the benefit of Korean Patent Application No. 10-2010-0045480, filed on May 14, 2010 and Korean Patent Application No. 10-2011-0020616, filed on Mar. 8, 2011, both filed in the Korean Intellectual Property Office, the disclosures of which are incorporated herein by reference.

BACKGROUND

1. Field

Aspects of the present disclosure relate to compounds, compositions including the same, fuel cell electrodes produced using the compounds or the compositions, fuel cell electrolyte membranes produced using the compounds or the compositions, and fuel cells including either fuel cell electrodes or fuel cell electrolyte membranes, or both fuel cell electrodes and fuel cell electrolyte membranes.

2. Description of the Related Art

Fuel cells that include a polymer electrolyte membrane operate at relatively low temperatures and may be manufactured in a small size. Thus, such fuel cells are expected to be used as energy sources in electric vehicles and distributed generation systems. Perfluorocarbon sulfonic acid-based polymer membranes, such as NAFION® membranes (available from E.I. du Pont de Nemours and Company), are commonly used as polymer electrolyte membranes for fuel cells. However, such polymer electrolyte membranes should be humidified in order to sufficiently conduct protons. In addition, to enhance cell system efficiencies, polymer electrolyte membranes should be operated at high temperatures, i.e., at least 100° C. However, moisture in the polymer electrolyte membrane is depleted and even evaporated at such temperatures, and thus, the effectiveness thereof is reduced.

To address such problems and/or other problems in the related art, non-humidified electrolyte membranes that operate at temperatures of at least 100° C. without humidification have been developed. For example, polybenzimidazole doped with phosphoric acid has been disclosed as a material for a non-humidified electrolyte membrane.

In regard to low-temperature perfluorocarbonsulfonate polymer electrolyte membrane fuel cells, hydrophobic electrodes including a water-repellent substance such as polytetrafluoroethylene (PTFE) have been introduced to prevent unwanted gas diffusion in an electrode (in particular in a cathode), which may be caused by water (product water) generated during electric power production in the electrode.

In regard to phosphoric acid fuel cells, which operate at temperatures of from 150 to 200° C., a liquid phosphoric acid electrolyte is used as an electrolyte. However, the liquid phosphoric acid included in a large amount in electrodes interferes with gas diffusion in the electrodes. Therefore, an electrode catalyst layer that includes polytetrafluoroethylene (PTFE) as a water repellent substance so as to prevent fine pores in the electrodes from being clogged by the phosphoric acid has been used.

In regard to fuel cells including a polybenzimidazole (PBI) electrolyte membrane, which uses phosphoric acid as a non-humidified electrolyte, in order to reduce contact between electrodes and the electrolyte membrane a method of impregnating the electrodes with a liquid phosphoric acid has been used, and a method of increasing the loading amount of metal catalysts has been used. However, such fuel cells do not exhibit improved properties.

When air is supplied to a cathode, activation takes about a week even if the electrode composition is optimized in a solid polymer electrolyte membrane doped with phosphoric acid. Although fuel cells can have improved efficiency and activation time can be decreased by replacing air with oxygen, use of oxygen is not preferable for commercialization reasons. In addition, a homogeneous polymer electrolyte membrane using the PBI is not satisfactory in terms of mechanical characteristics, chemical stability, or capability of retaining phosphoric acid. Thus, there is a need for further improvement.

SUMMARY

Provided are compounds with high thermal stability, compositions including the compounds, fuel cell electrodes produced using the compounds or the compositions, fuel cell electrolyte membranes produced using the compounds or the compositions, and fuel cells with improved cell voltage performance including either fuel cell electrodes or fuel cell electrolyte membranes, or both fuel cell electrodes and fuel cell electrolyte membranes.

According to an aspect of the present invention, a compound is a product obtained by polymerizing a composition that contains a diisocyanate-based compound represented by Formula 1 below and an aromatic polyol represented by Formula 2.

[Formula 1]

wherein in Formula 1, $A_1$ and $A_2$ are each, independently, a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C2-C30 heteroarylene group, a substituted or unsubstituted C4-C30 carbon cyclic group, or a substituted or unsubstituted C6-C30 condensed polycyclic group, m is 0 or 1, $R_1$ is a hydrogen atom or —P(=O)RR', R and R' are each, independently, a hydrogen atom, a C1-C30 alkyl group, or a C6-C30 aryl group, and L is represented by Formula 1A below:

wherein in Formula 1A, $R_2$ is a C1-C30 alkyl group, a C6-C30 aryl group, a C1-C30 alkoxy group, or a C6-C30 aryloxy group, and $$\text{OH} - \text{Ar}_1 - (\text{L} - \text{Ar}_2)_a - \text{OH}$$
$$\underset{R_1}{|}$$

[Formula 2]

wherein in Formula 2, $Ar_1$ and $Ar_2$ are each, independently, a substituted or unsubstituted C6-C30 arylene group, or a substituted or unsubstituted C2-C30 heteroarylene group, $R_1$ is a hydrogen atom or —P(=O)RR', R and R' are each, independently, a hydrogen atom, a C1-C30 alkyl group, or a C6-C30 aryl group, a is 0 or 1, and L is represented by Formula 1A below:

$$-\text{O}-\underset{\underset{R_2}{|}}{\overset{\overset{O}{\|}}{P}}-\text{O}-,$$

wherein in Formula 1A, $R_2$ is a C1-C30 alkyl group, a C6-C30 aryl group, a C1-C30 alkoxy group, or a C6-C30 aryloxy group.

According to another aspect of the present invention, a composition includes the compound and an interpenetration polymer.

According to another aspect of the present invention, a fuel cell electrode includes the compound.

According to another aspect of the present invention, a fuel cell electrode includes a catalyst layer that includes a coating product of the composition.

According to another aspect of the present invention, a fuel cell electrolyte membrane includes the compound According to another aspect of the present invention, a fuel cell electrolyte membrane includes the compound and an interpenetration polymer.

According to another aspect of the present invention, a fuel cell includes a cathode; an anode; and an electrolyte membrane interposed between the cathode and the anode, and one or more of the cathode, the anode, and the electrolyte membrane include the compound.

According to another aspect of the present invention, a fuel cell includes a cathode; an anode; and an electrolyte membrane interposed between the cathode and the anode, and one or more of the cathode, the anode, and the electrolyte membrane include the compound and an interpenetration polymer.

Additional aspects will be set forth in part in the description which follows and, in part, will be apparent from the description, or may be learned by practice of the presented embodiments.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

A compound according to an embodiment of the present invention is a product obtained by polymerizing a composition that contains a diisocyanate-based compound represented by Formula 1 below and an aromatic polyol represented by Formula 2 below:

$$\text{O}=\text{C}=\text{N}-\text{A}_1-(\text{L}-\text{A}_2)_m-\text{N}=\text{C}=\text{O}$$
$$\underset{R_1}{|}$$

[Formula 1]

wherein in Formula 1, $A_1$ and $A_2$ are each, independently, a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C2-C30 heteroarylene group, a substituted or unsubstituted C4-C30 carbon cyclic group, or a substituted or unsubstituted C6-C30 condensed polycyclic group, m is 0 or 1, $R_1$ is a hydrogen atom or —P(=O)RR', R and R' are each, independently, a hydrogen atom, a C1-C30 alkyl group, or a C6-C30 aryl group, and L is represented by Formula 1A below:

$$-\text{O}-\underset{\underset{R_2}{|}}{\overset{\overset{O}{\|}}{P}}-\text{O}-,$$

wherein in Formula 1A, $R_2$ is a C1-C30 alkyl group, a C6-C30 aryl group, a C1-C30 alkoxy group, or a C6-C30 aryloxy group, and $$\text{OH} - \text{A}_1 - (\text{L} - \text{A}_2)_a - \text{OH}$$
$$\underset{R_1}{|}$$

[Formula 2]

wherein in Formula 2, $Ar_1$ and $Ar_2$ are each, independently, a substituted or unsubstituted C6-C30 arylene group, or a substituted or unsubstituted C2-C30 heteroarylene group, $R_1$ is a hydrogen atom or —P(=O)RR', R and R' are each independently a hydrogen atom, a C1-C30 alkyl group, or a C6-C30 aryl group, a is 0 or 1, and L is represented by Formula 1A below:

$$-\text{O}-\underset{\underset{R_2}{|}}{\overset{\overset{O}{\|}}{P}}-\text{O}-,$$

wherein in Formula 1A, $R_2$ is a C1-C30 alkyl group, a C6-C30 aryl group, a C1-C30 alkoxy group, or a C6-C30 aryloxy group.

The amount of aromatic polyol of Formula 2 may be in the range of about 1 to about 1.1 mol based on 1 mol of the diisocyanate-based compound of Formula 1. When the amount of aromatic polyol of Formula 2 is within this range, the yield of the compound is high.

The diisocyanate-based compound may be an aliphatic diisocyanate-based compound or an aromatic diisocyanate-based compound. Examples of an aliphatic diisocyanate-based compound include compounds having the following chemical structures in Formula 3C:

[Formula 3C]

The term 'aromatic diisocyanate-based compound' includes a heteroaromatic diisocyanate-based compound. Examples of the aromatic diisocyanate-based compound include a compound represented by Formula 3A and compounds having the following chemical structures in Formula 3B:

[Formula 3A]

wherein $R_1$ is a single bond, or $-(CH_2)_a-$, $-(CF_2)_a-$, $-(CCl_2)_a-$, $-C(CH_3)_2-$, $-C(CF_3)_2-$, where $a$ is an integer in the range of 1 to 5, $-C(=O)-$, or $-S(=O)_2-$, and

[Formula 3B]

-continued

According to an embodiment, the aromatic diisocyanate-based compound that is represented by Formula 3A or has any one of the chemical structures in Formula 3B may be bis(4-isocyanatophenyl)methane (MDI).

The aromatic polyol of Formula 2 may be a compound selected from the group consisting of compounds represented by Formulae 4 to 8:

[Formula 4]

[Formula 5]

Formula 6]

[Formula 7]

and

[Formula 8]

The compound obtained by polymerizing the composition may be a compound represented by Formula 9 or Formula 10 below:

[Formula 9]

wherein $R_1$ is a single bond, or $-(CH_2)_a-$, $-(CF_2)_a-$, $-(CCl_2)_a-$, $-C(CH_3)_2-$, $-C(CF_3)_2-$, where a is an integer in the range of 1 to 5, $-C(=O)-$, or $-S(=O)_2-$, R and R' are each independently a hydrogen atom, a C1-C30 alkyl group, or a C6-C30 aryl, and n is an integer in the range of about 100 to about 4000; and

[Formula 10]

wherein in Formula 10, $n_2$ is an integer in the range of about 100 to about 200.

A number average molecular weight of the compound is in the range of about 1,500,000 to about 2,000,000.

Hereinafter, a method of preparing the compound obtained by polymerizing the composition will be described in detail.

As described above, the compound is obtained by polymerizing a prepolymer which has been obtained using the phosphorus-containing aromatic polyol and the aromatic diisocyanate. The phosphorus-containing aromatic polyol acts as a linker and the aromatic diisocyanate acts as a main chain backbone.

The diisocyanate-based compound of Formula 1, the aromatic polyol of Formula 2, and a solvent are mixed. In this regard, a polymerization and condensation reaction was performed thereon while the temperature of the solution was maintained at a temperature of about −10 to about 25° C., thereby preparing a corresponding prepolymer. When the reaction temperature is within this range, the polymerization and condensation reaction results in high yield.

Then, a catalyst is added to the reaction solution and then the catalyst-added solution is heat treated at a temperature of about 80 to about 130° C. to perform polymerization. As a result, a compound is obtained. When the heat treatment temperature is within this range, the compound is obtained in high yield.

The catalyst may be dibutyltin laurate or 1,4-diazabicyclo [2,2,2]-octane. The amount of the catalyst may be in the range of about $10^{-5}$ to about $10^{-2}$ mol, for example about $10^{-4}$ to about $10^{-2}$ mol, based on 1 mole of the diisocyanate-based compound. If the amount of the catalyst is within this range, the diisocyanate-based compound of Formula 1 and the aromatic polyol of Formula 2 have high reactivity.

The solvent may be dimethylacetate or dimethylformamide. The amount of solvent is in the range of about 80 to about 120 parts by weight based on 100 parts by weight of the diisocyanate-based compound.

A composition according to an embodiment of the present invention includes the compound and an interpenetration polymer. The interpenetration polymer is a material that enables formation of interpenetration polymer networks in the compound when mixed with the compound. The interpenetration polymer may include at least one material selected from the group consisting of a polyazole-based material, polyimide, polybenzoxazole, polybenzimidazole (PBI) and polybenzthiazole.

The polyazole-based material is a polymer having a repeating unit including at least one aryl ring having at least one nitrogen atom.

The aryl ring may be a five-membered or six-membered atom ring with one to three nitrogen atoms, which ring may be fused to another ring, for example, another aryl ring or heteroaryl ring. In this regard, the nitrogen atoms may be substituted with oxygen, phosphorus, and/or sulfur atom. Examples of the aryl ring are phenyl, naphthyl, hexahydroindyl, indanyl, and tetrahydronaphthyl.

The polyazole-based material may have at least one amino group in the repeating unit described above. In this regard, the at least one amino group may be a primary, secondary, or tertiary amino group which is either part of the aryl ring or part of a substituent of the aryl unit.

The term "amino" includes compounds where a nitrogen atom is covalently bonded to at least one carbon or heteroatom. The term "amino" also includes $-NH_2$ and also includes substituted moieties.

The term also includes "alkyl amino" wherein the nitrogen is bound to at least one additional alkyl group. The term also includes "arylamino" and "diarylamino" groups wherein the nitrogen is bound to at least one or two independently selected aryl groups, respectively

Methods of preparing the polyazole-based material and a polymer film including the polyazole-based material are disclosed in US Patent Publication 2005/256296A.

The polyazole-based material may include an azole unit represented by Formulae 13 to 26 below:

[Formula 13]

[Formula 14]

[Formula 15]

-continued

[Formula 16]

[Formula 17]

[Formula 18]

[Formula 19]

[Formula 20]

[Formula 21]

[Formula 22]

[Formula 23]

[Formula 24]

[Formula 25]

[Formula 26]

In Formulae 13 to 26, $Ar^0$ may be identical to or different from each other, and may be a bivalent monocyclic or polycyclic C6-C20 aryl group or C2-C20 heteroaryl group, Ar may be identical to or different from each other, and may be each a tetravalent monocyclic or polycyclic C6-C20 aryl group or C2-C20 heteroaryl group, $Ar^1$ may be identical to or different from each other, and may be each a bivalent monocyclic or polycyclic C6-C20 aryl group or C2-C20 heteroaryl group, $Ar^2$ may be identical to or different from each other, and may be each a bivalent or trivalent monocyclic or polycyclic C6-C20 aryl group or C2-C20 heteroaryl group, $Ar^3$ may be identical to or different from each other, and may be each a trivalent monocyclic or polycyclic C6-C20 aryl group or C2-C20 heteroaryl group, $Ar^4$ may be identical to or different from each other, and may be each a trivalent monocyclic or polycyclic C6-C20 aryl group or C2-C20 heteroaryl group, $Ar^5$ may be identical to or different from each other, and may be each a tetravalent monocyclic or polycyclic C6-C20 aryl group or C2-C20 heteroaryl group, $Ar^6$ may be identical to or different from each other, and may be each a bivalent monocyclic or polycyclic C6-C20 aryl group or C2-C20 heteroaryl group, $Ar^7$ may be identical to or different from each other, and may be each a bivalent monocyclic or polycyclic C6-C20 aryl group or C2-C20 heteroaryl group, $A^8$ may be identical to or different from each other, and may be each a trivalent monocyclic or polycyclic C6-C20 aryl group or C2-C20 heteroaryl group, $Ar^9$ may be identical to or different from each other, and may be each a bivalent, trivalent or tetravalent monocyclic or polycyclic C6-C20 aryl group or C2-C20 heteroaryl group, $Ar^{10}$ may be identical to or different from each other, and may be each a bivalent or trivalent monocyclic or polycyclic C6-C20 aryl group or C2-C20 heteroaryl group, $Ar^{11}$ may be identical to or different from each other, and may be each a bivalent monocyclic or polycyclic C6-C20 aryl group or C2-C20 heteroaryl group, $X_3$ to $X_{11}$ may be identical to or different from each other, and may be each an oxygen atom, a sulfur atom, or —N(R') where R' is a hydrogen atom, a C1-C20 alkyl group, a C1-C20 alkoxy group, or a C6-C20 aryl group, $R_9$ may be identical to or different from each other, and may be each a hydrogen atom, a C1-C20 alkyl group, or a C6-C20 aryl group, and each of $n_0$, $n_4$ to $n_{16}$, and $m_2$ is an integer equal to or higher than 10, or for example, an integer equal to or higher than 100, or for example an integer in the range of 100 to 100,000.

Examples of the aryl or heteroaryl group include benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiazole, benzoxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline, and phenanthrene, wherein these aryl or heteroaryl groups may have a substituent.

$Ar^0$, Ar, $Ar^1$, $Ar^4$, $Ar^6$, $Ar^7$, $Ar^8$, $A^9$, $Ar^{10}$, and $Ar^{11}$ defined above may have any substitutable pattern. For example, if $Ar^0$, Ar, $Ar^1$, $Ar^4$, $Ar^6$, $Ar^7$, $Ar^8$, $A^9$, $Ar^{10}$ and $Ar^{11}$ are phenylene, $Ar^0$, Ar, $Ar^1$, $Ar^4$, $Ar^6$, $Ar^7$, $Ar^8$, $Ar^9$, $Ar^{10}$ and $Ar^{11}$ may be ortho-phenylene, meta-phenylene, or para-phenylene.

The alkyl group may be a short-chain C1-C4 alkyl group, such as methyl, ethyl, n-propyl, i-propyl, or t-butyl. The aryl group may be, for example, a phenyl group or a naphthyl group.

Examples of the substituent include a halogen atom, such as fluorine, an amino group, a hydroxyl group, and a short-chain alkyl group, such as methyl or ethyl.

Examples of the polyazole-based material include polyimidazole, polybenzothiazole, polybenzoxazole, polyoxadiazole, polyquinoxaline, polythiadiazole, polypyridine, polypyrimidine, and polytetrazapyrene.

The polyazole-based material may be a copolymer or blend including at least two units selected from the group consisting of units represented by Formulae 13 to 26 above. The polyazole-based material may be a block copolymer (di-block or tri-block), a random copolymer, a periodic copolymer, or an alternating polymer, each of which includes at least two units selected from the units of Formulae 13 to 26.

For example, the polyazole-based material used to prepare the composition may be a polyazole-based material including at least one of the units of Formulae 13 and 14.

Examples of the polyazole-based material are polymers represented by Formulae 27 to 53 below:

[Formula 27]

[Formula 28]

[Formula 29]

[Formula 30]

[Formula 31]

[Formula 32]

[Formula 33]

[Formula 34]

[Formula 35]

[Formaula 36]

-continued

[Formula 37]

[Formula 38]

[Formula 39]

[Formula 40]

[Formula 41]

[Formula 42]

[Formula 43]

[Formula 44]

[Formula 45]

[Formula 46]

[Formula 47]

[Formula 48]

[Formula 49]

[Formula 50]

[Formula 51]

-continued

[Formula 52]

[Formula 53]

wherein in Formulae 27 to 53, each of I, $n_{17}$ to $n_{43}$ and $m_3$ to $m_7$ may be an integer of 10 or more, for example, an integer of 100 or more, z indicates a chemical bond, or $-(CH_2)_S-$, $-C(=O)-$, $-SO_2-$, $-C(CH_3)_2-$, or $-C(CF_3)_2-$, and s is an integer of 1 to 5.

Examples of the interpenetration polymer include polybenzimidazole(PBI), polybenzthiazole, polybenzoxazole, polyimide and a polyazole-based material, Examples of the polybenzimidazole are a compound (m-PBI) represented by Formula 11 or a compound represented by Formula 12 below:

[Formula 11]

wherein in Formula 11, $n_3$ is an integer of 10 or more, for example, an integer of 100 or more, and a number average molecular weight of the polymer is equal to or less than 1,000,000; and

[Formula 12]

wherein in Formula 12, $n_3'$ is about 10 or more, for example, about 100 or more. These polymeric compounds may have a number average molecular weight of about 3,090 or more, for example, in the range of about 30,900 to about 1,000,000.

The amount of the interpenetration polymer may be in the range of about 0.1 to about 100 parts by weight based on 100 parts by weight of the compound. If the amount of the interpenetration polymer is within this range, the composition that includes the compound and the interpenetration polymer has a high phosphoric-acid retaining capability.

The composition that includes the compound and the interpenetration polymer may undergo a heat treatment process at a temperature in the range of about 50 to about 250° C., for example, in the range of about 80 to about 220° C. If necessary, the heat treatment process may not be used.

Meanwhile, the prepolymer that has been prepared in the course of preparation of the compound may be mixed with the interpenetration polymer and then heat treated at a temperature of about 50 to about 250° C., for example, about 80 to about 220° C. In this case, the prepolymer is reacted with the interpenetration polymer to produce a cross-linked product of the prepolymer.

A fuel cell electrode (hereinafter also called an electrode) according to an embodiment of the present invention includes the compound or the composition including the compound and the interpenetration polymer.

The electrode may include a catalyst layer which includes the compound.

The electrode may include a catalyst layer which includes a coating product of the composition.

The term "coating product of the composition" refers to a product obtained by coating of the composition and then heating the same. In this regard, the heat-treatment process is optional. Accordingly, the coating product of the composition may include a blend of the compound and the interpenetration polymer.

The compound or the composition may act as a binder in an electrode, and thus, enables manufacture of an electrode without use of a conventional binder. In addition, high electrode performance may be obtained using a smaller amount of a catalyst loaded than in conventional cases.

An electrode produced using the compound or the composition has a high heat resistance. In addition, the electrode has high oxygen permeability, and thus, activation time taken for obtaining optimal performance is reduced. Moreover, wettability of phosphoric acid doped into the electrode is improved. Thus, a fuel cell, including the electrode described above, may operate in high-temperature, under non-humidified conditions, and may provide improved thermal stability and power generation.

In the electrode, the amount of the compound or the composition may be in the range of about 0.001 to about 0.65 parts by weight, for example, about 0.01 to about 0.05 parts by weight, based on 1 part by weight of a catalyst. If the amount of the compound or the composition is within this range, an electrode including the compound or the composition has thermal resistance.

The catalyst may be platinum (Pt), or an alloy or a mixture of platinum (Pt) and at least one metal selected from the group consisting of gold (Au), palladium (Pd), rhodium (Rh), iridium (Ir), ruthenium (Ru), tin (Sn), molybdenum (Mo), cobalt (Co), and chromium (Cr). The Pt, the alloy, or the mixture may be supported on a carbonaceous support. For example, the catalyst may be at least one metal selected from the group consisting of Pt, a PtCo alloy, and a PtRu alloy. Such a metal may be supported on a carbonaceous support.

The electrode may further include a binder conventionally used in the manufacture of an electrode for a fuel cell. The binder may be at least one binder selected from the group consisting of poly(vinylidenefluoride), polytetrafluoroethylene (PTFE), a fluorinated ethylene propylene (FEP), a styrene butadiene rubber (SBR), and polyurethane.

The amount of the binder may be in the range of about 0.001 parts to about 0.5 parts by weight, based on 1 part by weight of the catalyst. If the amount of the binder is within the range described above, a wetting state of the electrode may be improved.

A method of manufacturing a fuel cell electrode as described above will now be described. First, a catalyst is dispersed in a solvent to obtain a dispersion solution. The solvent may include N-methylpyrrolidone (NMP), dimethylformamide (DMAc), or the like. The amount of the solvent may be in the range of about 1 part to about 10 parts by weight based on 1 part by weight of the catalyst.

A compound is added to the dispersion solution. Alternatively, a compound and an interpenetration polymer are added to the dispersion solution. For this step, the solvent also may include N-methylpyrrolidone (NMP), N,N'-dimethylacetamide (DMAc), or the like.

The resultant mixture is coated on the surface of a carbon support in order to complete the manufacture of the electrode. The coating operation may be easily performed when the carbon support is fixed to a glass substrate. The coating method is not particularly limited. Examples of the coating method include coating using a doctor blade, bar coating, screen printing, and the like.

The coated resultant is dried at a temperature in the range of about 20 to about 150° C., to remove the solvent. The drying time may vary according to the drying temperature, and may be in the range of about 10 to about 60 minutes. After the coating and drying, if necessary, the coated and dried resultant is heat treated at a temperature of about 50 to about 250° C.

In regard to the electrode, the catalyst layer may further include at least one proton conductor selected from the group consisting of phosphoric acid and a C1-C20 organic phosphonic acid. The amount of the proton conductor may be in the range of about 10 to about 1000 parts by weight based on 100 parts by weight of the total weight of the electrode. Although the concentration of the acids described above is not particularly limited, when phosphoric acid is used, a phosphoric acid aqueous solution with a 85 weight % is used as the phosphoric acid, and the time taken for immersing in the phosphoric acid may be in the range of about 2.5 hours to about 14 hours at a temperature of about 80° C. Examples of the C1-C20 organic phosphonic acid include methyl phosphonic acid, and ethyl phosphonic acid.

A fuel cell electrolyte membrane (hereinafter also referred to as electrolyte membrane) according to an embodiment of the present invention includes the compound or the composition including the compound and the interpenetration polymer. The electrolyte membrane according to the present embodiment has higher thermal resistance than an electrolyte membrane that includes only polybenzimidazole.

Hereinafter, the electrolyte membrane and a method of producing the electrolyte membrane will now be described in detail. First, the electrolyte membrane including the compound or the composition is produced in the same manner as in a conventional method of producing an electrolyte membrane using polybenzimidazole, except that the compound or the composition is used instead of polybenzimidazole.

The method of producing an electrolyte membrane including the compound or the composition will now be described. A compound, or a blend of a compound and an interpenetration polymer is cured at a temperature of about 50 to about 250° C., for example, in the range of about 80 to about 220° C. Then, the cured product is impregnated with a proton conductor such as an acid, thereby completing the production of the electrolyte membrane. The type and amount of the interpenetration polymer have already been presented above.

A tape coating method or a common coating method may be used to form the electrolyte membrane. An example of the common coating method may be a method of casting the mixture on a support using a doctor blade. Herein, a doctor blade with a gap of about 250 to about 500 µm is used.

When the casting method using a doctor blade is used, the method of preparing the electrolyte membrane may further include separating the electrolyte membrane from the support, after curing and before impregnating with an acid. When the electrolyte membrane is separated from the support, the mixture is immersed in distilled water at a temperature range of about 60 to about 80° C.

The support may be any suitable support for the electrolyte membrane, for example, a glass substrate, a polyimide film, and the like. When the tape casting method is used, a tape-cast membrane is separated from a support, such as polyethylene terephthalate, before being cured, and is then put into an oven for curing. Thus, the process of removing the support after curing is unnecessary. The formed membrane is heat treated and then impregnated with a proton conductor such as an acid, thereby completing the production of the electrolyte membrane.

A method of manufacturing a membrane and electrode assembly (MEA) of a fuel cell will now be described in detail. The term "membrane-electrode assembly" refers to a structure in which an electrolyte membrane is disposed between two electrodes, each electrode including a catalyst layer and a diffusion layer.

The MEA may be formed by positioning the electrodes, which include respective catalyst layers, on opposite sides of the electrolyte membrane, joining them all together at a high temperature and high pressure, and then joining a diffusion layer (fuel diffusion layer) to each of the catalyst layers.

For example, the electrolyte membrane may be a polybenzimidazole electrolyte membrane, a polybenzoxazine-polybenzimidazole copolymer electrolyte membrane, or a porous polytetrafluoroethylene (PTFE) membrane. Alternatively, an electrolyte membrane including the compound or the composition may be used.

If the electrolyte membrane including either the compound or the composition is used, when a three-phase boundary is formed of the same material, the contact resistance between the electrode and the electrolyte membrane is reduced due to improved compatibility, and thus, fuel cell performance may be enhanced. The joining may be performed with a pressure of about 0.1 to about 3 ton/cm$^2$, for example, a pressure of about 1 ton/cm$^2$, at a temperature at which the electrolyte membrane is softened.

Next, bipolar plates are respectively installed on both sides of the MEA, to complete a fuel cell. The bipolar plates may have grooves for supplying fuel and may function as current collectors.

The type of the fuel cell is not limited, and according to an embodiment, the fuel cell may be a polymer electrolyte membrane fuel cell.

Substituents in the formulae above may be defined as follows.

Examples of the alkyl group used herein are, but are not limited to, methyl, ethyl, propyl, isobutyl, sec-butyl, pentyl, iso-amyl, or hexyl, and at least one hydrogen atom of the alkyl group may be substituted with a halogen atom, a $C_1$-$C_{20}$ alkyl group substituted with a halogen atom (for example, $CCF_3$, $CHCF_2$, $CH_2F$ and $CCl_3$), a hydroxy group, a nitro group, a cyano group, an amino group, an amidino group, a hydrazine, a hydrazone, a carboxyl group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

Examples of the alkoxy group used herein are, but are not limited to, methoxy, ethoxy, and propoxy, and at least one hydrogen atom of the alkoxy group may be substituted with any one of the substituents presented above where the alkyl group is described.

Examples of the alkenyl group used herein are, but are not limited to, vinylene or allylene, and at least one hydrogen atom of the alkenyl group may be substituted with may be substituted with any one of the substituents presented above where the alkyl group is described.

Examples of the alkynyl group used herein are, but are not limited to, acetylene, and at least one hydrogen atom of the alkynyl group may be substituted with any one of the substituents presented above where the alkyl group is described.

The aryl group used herein is used alone or in combination, and refers to an aromatic hydrocarbon group having one or more rings, and examples thereof are phenyl, naphthyl, and tetrahydronaphthyl. At least one hydrogen atom of the aryl group may be substituted with any one of the substituents presented above where the alkyl group is described.

Examples of the aryloxy group used herein are phenoxy, and at least one hydrogen atom of the aryloxy group may be substituted with any one of the substituents presented above where the alkyl group is described.

The heteroaryl group used herein refers to an organic compound that contains one or more hetero atoms selected from N, O, P, and S, and the remaining ring atoms are carton atoms. At least one hydrogen atom of the heteroaryl group may be substituted with any one of the substituents presented above where the alkyl group is described.

The carbon ring group used herein refers to a ring group that consists of only carbon atoms, and an example thereof is a cyclohexyl group, and at least one hydrogen atom of the carbon ring group may be substituted with any one of the substituents presented above where the alkyl group is described.

The heterocyclic group used herein refers to a ring containing a hetero atom such as N, S, P, or O, and an example thereof is pyridyl, and at least one hydrogen atom in the heterocyclic group may be substituted with any one of the substituents presented above where the alkyl group is described.

Examples of the halogen atom used herein are F, Cl, Br, etc, and the term 'halogenated' used where the substitutents are defined refers to being substituted with a halogen atom, such as F, Cl, or Br, or an organic group containing a halogen atom.

At least one hydrogen atom in each of the arylene group, the heteroarylene group, the heteroaryloxy group, the carbon ring group, the heterocyclic alkyl group, the carbon ring alkyl group, and the heteroaryl alkyl group, used herein, may be substituted with any one of the substituents presented above where the alkyl group is described.

The present invention will be described in further detail with reference to the following examples. These examples are for illustrative purposes only and are not intended to limit the scope of the present invention.

Synthesis Example 1

Preparation of Compound Represented by Formula 10 (MDI-PPQ)

[Reaction Scheme 1]

Formula 10 where, n is 10-300.

While nitrogen was loaded into a 25 mL 2-neck round bottom flask, 1 g of bis(4-isocyanatophenyl)methane (MDI) (4.00 mmol) was dissolved in 10 mL of N,N'-dimethylacetamide (DMAc), thereby preparing an MDI solution.

Separately, 1.22 g of diphenylphosphinyl hydroquinone (PPQ) (4.00 mmol) was dissolved in 12 mL of N,N'-dimethylacetamide (DMAc), thereby preparing a PPQ solution.

At a temperature of about 20 to about 25° C., the PPQ solution was dropped to the MDI solution and then the mixed solution was stirred. Then, 0.01 mol % dibutyltin dilaurate based on 1 mol of MDI was added to the mixture and then, the temperature was increased to 100° C. and polymerization was performed for 3 days. During the reaction, the reaction solution gradually changed into dark brown.

Figure 1:
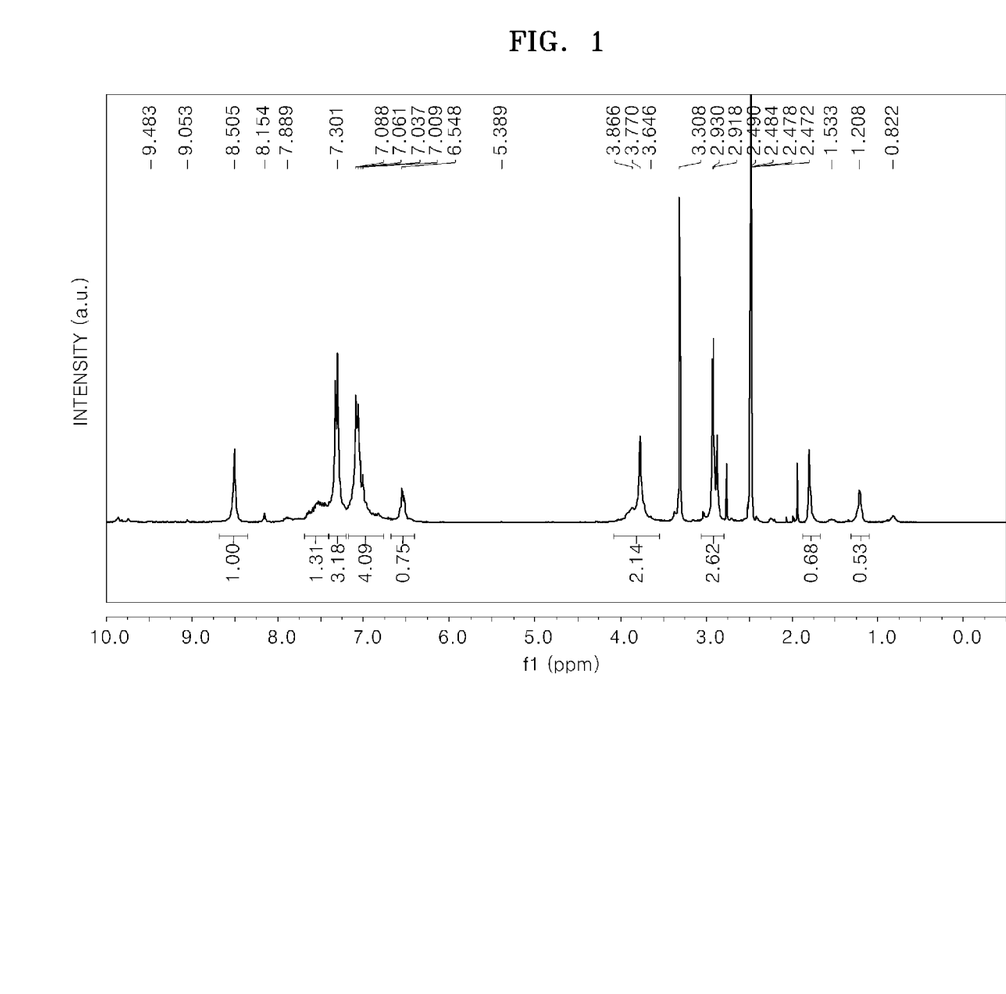
FIG. 1 shows a nuclear magnetic resonance spectrum of a compound prepared according to Synthesis Example 1.

When the reaction was completed, the polymerization solution was added to 50 mL of distilled water to obtain a precipitate. The precipitate was washed with tetrahydrofuran (THF) and then placed in a vacuum oven for drying for 24 or more hours, thereby preparing a compound represented by Formula 10. The structure of the compound represented by Formula 10 was identified by nuclear magnetic resonance (NMR) (see FIG. 1).

Figure 2:
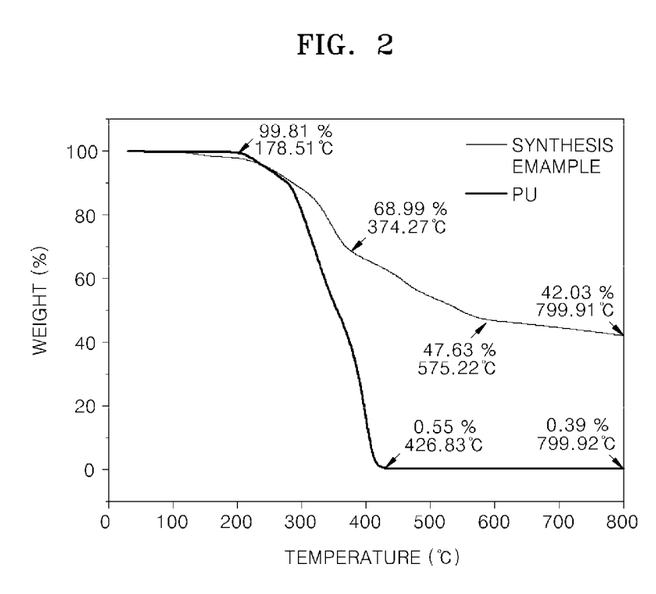
FIG. 2 shows thermal characteristics of a compound prepared according to Synthesis Example 1.

Thermal characteristics of the compound (MDI-PPQ) prepared according to Synthesis Example 1 were analyzed by using a thermogravimetric analyzer (TGA), and the results are shown in FIG. 2. The TGA was performed while increasing the temperature to 800° C. at a rate of 10° C./min in a nitrogen or air atmosphere, wherein the nitrogen or air was set at a flowrate of 35 ml/min. In FIG. 2, a phosphorus-free compound is also shown in order to compare it with thermal characteristics of the compound prepared according to Synthesis Example 1. In FIG. 2, the curve of PU shows the thermal characteristics of the phosphorus-free compound (Sambu Fine Chemical Co., Ltd., SBW-700).

Referring to FIG. 2, by comparing the 90% weight loss temperature of the phosphorus-free compound (PU) with the 90% weight loss temperature of the compound prepared according to Synthesis Example 1, it was confirmed that the compound prepared according to Synthesis Example 1 had excellent thermal stability.

The molecular weight of the compound prepared according to Synthesis Example 1 was measured by gel permeation chromatography (GPC). The results are shown in Table 1.

TABLE 1

|  | Synthesis Example 1 |
| --- | --- |
| Mn | $1.51 \times 10^6$ |
| Mw | $2.01 \times 10^6$ |
| Mp | $1.81 \times 10^6$ |
| Polydispersity | 1.31 |

In Table 1, Mn represents the number average molecular weight, Mw represents the weight average molecular weight, and Mp represents the peak weight average molecular weight.

Example 1

Manufacture of Electrodes for Fuel Cells and a Fuel Cell Including the Electrodes

0.65 g of a catalyst including 50% by weight of PtCo supported on carbon, and 3.3 g of N-methylpyrrolidone (NMP) as a solvent were added to a stirring vessel, and the mixture was stirred to prepare a slurry. A solution of the compound of Formula 10 prepared according to Synthesis Example 1 dissolved in the NMP solution was added to the slurry until the amount of the compound of Formula 10 was 0.136 g, and then stirred to prepare a slurry for forming a cathode catalyst layer.

Carbon paper was cut to a size of $4 \times 7$ cm$^2$, fixed to a glass plate, and coated with the slurry by using a doctor blade (Sheen Instruments Ltd) with a gap of about 600 μm. The slurry for forming the cathode catalyst layer was coated on the carbon paper and dried at room temperature for one hour, at 80° C. for one hour, at 120° C. for 30 minutes, and at 150° C. for 15 minutes to form a cathode (fuel electrode). The amount of Pt in PtCo in the cathode was about 1.73 mg/cm$^2$.

An anode was manufactured as follows. 2 g of a catalyst including 50 wt % of Pt supported on carbon, and 9 g of NMP as a solvent were put into a stirring vessel, and the mixture was stirred for 2 minutes at a high speed.

Subsequently, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer, using a bar coater, to complete the manufacture of the anode.

Separately, 60 parts by weight of a benzoxazine-based monomer represented by Formula 11, 3 parts by weight of a benzoxazine-based monomer represented by Formula 12, and 37 parts by weight of polybenzimidazole were blended and then the resultant mixture was cured at a temperature of about 220° C.:

[Formula 11]

and

[Formula 12]

wherein $R_2$ is phenyl.

Subsequently, the resultant was impregnated with 85 wt % of phosphoric acid at 80° C. for 4 hours or longer to form an electrolyte membrane. Herein, the amount of phosphoric acid was about 480 parts by weight based on 100 parts by weight of the electrolyte membrane.

The electrolyte membrane was disposed between the cathode and the anode to manufacture a membrane-electrode assembly (MEA). The cathode and the anode were not impregnated with phosphoric acid.

To prevent gas permeation between the cathode and the anode, a PTFE membrane main-gasket having a thickness of 200 μm and a PTFE membrane sub-gasket having a thickness of 20 μm were joined and disposed between each of the anode and cathode and the electrolyte membrane. The pressure applied to the MEAS was adjusted using a torque wrench, and was stepwise increased using 1, 2, and 3 N-m torque wrenches.

Electricity was generated by supplying hydrogen to the anode (flow rate: about 100 ccm) and air to the cathode (flow rate: about 250 ccm), at 150° C., without humidifying the electrolyte membrane, and characteristics of the fuel cell were measured. Herein, the electrolyte membrane doped with phosphoric acid was used, and thus, the performance of the fuel cell improved over time. Due to this characteristic, the fuel cell was tested after being aged until an operating voltage thereof reached a maximum point. In addition, the areas of the cathode and anode were fixed to a size of $2.8 \times 2.8$ (7.84 cm$^2$), and the thickness of the cathode was about 430 μm and the thickness of the anode was about 390 μm.

Comparative Example 1

Manufacture of Electrodes for Fuel Cells and a Fuel Cell Including the Electrodes A cathode and a fuel cell including the same were manufactured in the same manner as in Example 1, except that the cathode was manufactured using 0.2176 g of a compound (Sambu Fine Chemical Co., Ltd., SBW-700) instead of 0.136 g of the compound represented by Formula 10. The amount of Pt in PtCo supported in the cathode was about 1.78 mg/cm$^2$.

Comparative Example 2

Manufacture of Electrodes for Fuel Cells and a Fuel Cell Including the Electrodes A cathode and a fuel cell including the same were manufactured in the same manner as in Example 1, except that the cathode was manufactured using 0.34 g of polyvinylidenfluoride instead of 0.136 g of the compound represented by Formula 10. The amount of Pt in PtCo supported in the cathode was about 1.5 mg/cm$^2$.

Figure 3:
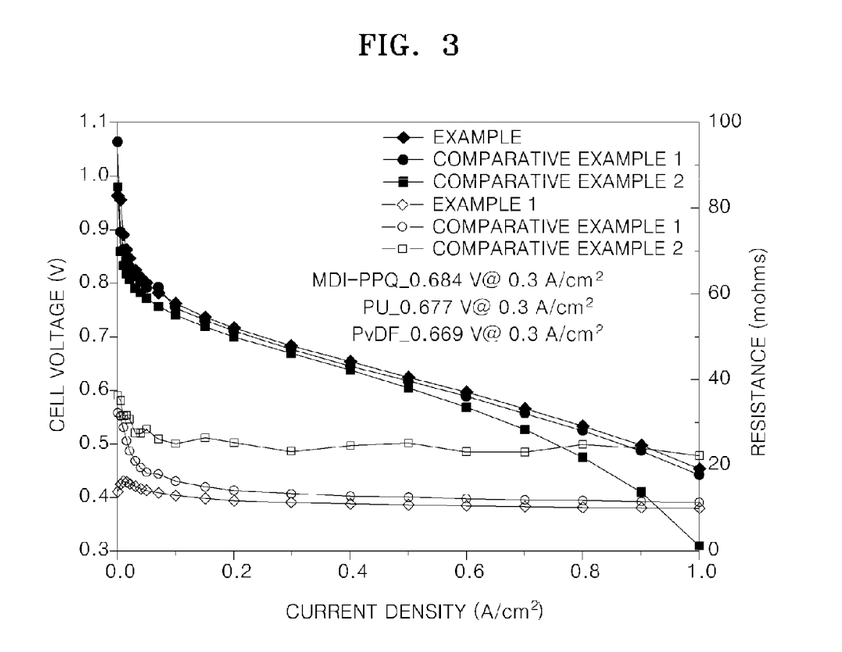
FIG. 3 is a graph of voltage with respect to current density of fuel cells manufactured according to Example 1 and Comparative Examples 1-2.

Changes in cell voltages of the fuel cells manufactured in Example 1 and Comparative Examples 1 and 2 with respect to current density were measured. The results are shown in FIG. 3. In FIG. 3, "♦, ● and ■" represent voltage characteristics, and "◇, ○, □" represent resistance characteristics.

Referring to FIG. 3, cell voltage characteristics and cell resistance characteristics of the fuel cell of Example 1 improved compared to the fuel cells of Comparative Examples 1 and 2.

As described above, the compounds and the compositions including the compounds, according to the one or more of the above embodiments of the present invention, have thermal resistance and resistance to a phosphoric acid. In addition, a fuel cell electrode and a fuel cell electrolyte membrane, each of which includes the compounds or the compositions including the compounds, provide a fuel cell having a long lifetime and high cell performance.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A compound comprising a polymerization product of a composition that contains a diisocyanate-based compound represented by Formula 1 below and an aromatic polyol represented by Formulae 4-8 below:

[Formula 1]

wherein $A_1$ and $A_2$ are each independently a substituted or unsubstituted C1-C30 alkylene group, a substituted or unsubstituted C2-C30 alkenylene group, a substituted or unsubstituted C2-C30 alkynylene group, a substituted or unsubstituted C6-C30 arylene group, a substituted or unsubstituted C2-C30 heteroarylene group, a substituted or unsubstituted C4-C30 carbon cyclic group, or a substituted or unsubstituted C6-C30 condensed polycyclic group, m is 0 or 1,

$R_1$ is a hydrogen atom or —P(=O)RR',

R and R' are each independently a hydrogen atom, a C1-C30 alkyl group, or a C6-C30 aryl group, and

L is represented by Formula 1A below:

wherein in Formula 1A, $R_2$ is a C1-C30 alkyl group, a C6-C30 aryl group, a C1-C30 alkoxy group, or a C6-C30 aryloxy group, and

[Formula 4]

[Formula 5]

[Formula 6]

[Formula 7]

and

[Formula 8]

2. A composition comprising the compound of claim 1 and an interpenetration polymer.

3. The composition of claim 2, wherein the interpenetration polymer comprises at least one material selected from the group consisting of a polyazole-based material, polyimide, polybenzoxazole, polybenzimidazole (PBI) and polybenzthiazole.

4. The composition of claim 2, wherein the amount of the interpenetration polymer is in a range of about 0.1 to about 100 parts by weight based on 100 parts by weight of the compound.

5. A fuel cell electrode comprising the compound of claim 1.

6. A fuel cell electrode comprising a catalyst layer that includes a coating product of the composition of claim 2.

7. A fuel cell electrolyte membrane comprising the compound of claim 1.

8. A fuel cell electrolyte membrane comprising the composition of claim 2.

9. A fuel cell comprising a cathode; an anode; and an electrolyte membrane interposed between the cathode and the anode,
wherein one or more of the cathode, the anode, and the electrolyte membrane include the compound of claim 1.

10. A fuel cell comprising a cathode; an anode; and an electrolyte membrane interposed between the cathode and the anode,
wherein one or more of the cathode, the anode, and the electrolyte membrane include the composition of claim 2.

11. A compound comprising a polymerization product of a composition that contains a diisocyanate-based compound selected from a compound represented by Formula 3A, a compound represented by Formula 3B and a compound represented by Formula 3C below and an aromatic polyol represented by Formulae 2 below:

[Formula 3A]

wherein in Formula 3A, $R_1$ is a single bond, or —$(CH_2)_a$—, —$(CF_2)_a$—, —$(CCl_2)_a$—, —$C(CH_3)_2$—, —$C(CF_3)_2$—, where a is an integer in the range of 1 to 5, —$C(=O)$—, or —$S(=O)_2$—,

[Formula 3B]

[Formula 3C]

[Formula 2]

wherein in Formula 2, $Ar_1$ and $Ar_2$ are each independently a substituted or unsubstituted C6-C30 arylene group, or a substituted or unsubstituted C2-C30 heteroarylene group, $R_1$ is a hydrogen atom or —P(=O)RR', R and R' are each independently a hydrogen atom, a C1-C30 alkyl group, or a C6-C30 aryl group, a is 0 or 1, and

L is represented by Formula 1A below:

wherein in Formula 1A, $R_2$ is a C1-C30 alkyl group, a C6-C30 aryl group, a C1-C30 alkoxy group, or a C6-C30 aryloxy group.

12. The compound of claim 11, wherein the compound is a compound represented by Formula 9:

[Formula 9]

wherein $R_1$ is a single bond, or —$(CH_2)_a$—, —$(CF_2)_a$—, —$(CCl_2)_a$—, —$C(CH_3)_2$—, —$C(CF_3)_2$—, where a is an integer in the range of 1 to 5, —$C(=O)$—, or —$S(=O)_2$—, R and R' are each independently a hydrogen atom, a C1-C30 alkyl group, or a C6-C30 aryl, and n is an integer in the range of 100 to 200.

13. The compound of claim 11, wherein the compound is a compound represented by Formula 10:

[Formula 10]

wherein n is an integer of 100 to 200.

14. The compound of claim 11, wherein the aromatic polyol of Formula 2 is compound selected from the group consisting of compounds represented by Formula 4 through 8:

[Formula 4]

[Formula 5]

[Formula 6]

[Formula 7]

[Formula 8]

15. A composition comprising the compound of claim 11 and an interpentration polymer.

16. A fuel cell electrode comprising the compound of claim 11.

17. A fuel cell electrode comprising a catalyst layer that includes a coating product of the composition of claim 15.

18. A fuel cell electrolyte membrane comprising the compound of claim 11.

19. A fuel cell electrolyte membrane comprising the composition of claim 15.

* * * * *